United States Patent
Egan et al.

(10) Patent No.: US 10,823,036 B1
(45) Date of Patent: Nov. 3, 2020

(54) METHOD AND APPARATUS TO ACCOMMODATE SENSORS ON AN EXHAUST COMPONENT

(71) Applicant: Faurecia Emissions Control Technologies, USA, LLC, Columbus, IN (US)

(72) Inventors: James Egan, Indianapolis, IN (US); Jithender Bhog, Bangalore (IN); Matt Green, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/451,884

(22) Filed: Jun. 25, 2019

(51) Int. Cl.
| | |
|---|---|
| *F01N 13/00* | (2010.01) |
| *F16L 55/033* | (2006.01) |
| *F01N 1/02* | (2006.01) |
| *F01N 13/14* | (2010.01) |

(52) U.S. Cl.
CPC ........... *F01N 13/008* (2013.01); *F01N 1/026* (2013.01); *F16L 55/033* (2013.01); *F01N 13/141* (2013.01); *F01N 2470/24* (2013.01)

(58) Field of Classification Search
CPC ................ F01N 3/2839; F01N 13/102; F01N 13/14–148; F01N 13/1811; F01N 2610/148
See application file for complete search history.

(56) References Cited

U.S. PATENT DOCUMENTS

| | | | |
|---|---|---|---|
| 2007/0178026 A1* | 8/2007 | Roth | F01N 13/008 422/177 |
| 2011/0088968 A1* | 4/2011 | Kempf | F01N 1/023 181/250 |
| 2015/0059457 A1* | 3/2015 | Niaz | F01N 3/28 73/114.71 |

* cited by examiner

*Primary Examiner* — Jonathan R Matthias
(74) *Attorney, Agent, or Firm* — Carlson, Gaskey & Olds, P.C.

(57) ABSTRACT

An exhaust component assembly includes a component housing defined by an outer dimension and having at least one sensor opening. A sensor boss surrounds the at least one sensor opening and at least one exhaust component is positioned radially outwardly of the component housing and includes an opening that surrounds the at least one sensor opening. A first flange extends about an outer periphery of the sensor boss and a second flange is associated with the opening of the at least one exhaust component to accommodate variations in the outer dimension such that the first and the second flanges can be attached to each other.

21 Claims, 5 Drawing Sheets

METHOD AND APPARATUS TO ACCOMMODATE SENSORS ON AN EXHAUST COMPONENT

TECHNICAL FIELD

The subject disclosure relates to providing a connection interface between an aftertreatment component with a sensor boss and a secondary housing surrounding the aftertreatment component to accommodate for diameter variance in a housing of the aftertreatment component.

BACKGROUND

An exhaust system conducts hot exhaust gases generated by an engine through various exhaust components to reduce emissions, improve fuel economy, and control noise. The exhaust system includes a hot end section that includes exhaust components that are the most closely coupled to the engine, and a cold end section that extends downstream of the hot end section. Traditionally, the hot-end section includes the exhaust components used for emissions aftertreatment and the cold-end section includes the exhaust components used for acoustic purposes. However, due to increasingly limited package space available in the cold-end section, there is a need for new acoustic solutions.

SUMMARY

In one exemplary embodiment, an exhaust component assembly includes a component housing defined by an outer dimension and having at least one sensor opening. A sensor boss surrounds the at least one sensor opening and at least one exhaust component is positioned radially outwardly of the component housing and includes an opening that surrounds the at least one sensor opening. A first flange extends about an outer periphery of the sensor boss and a second flange is associated with the opening of the at least one exhaust component to accommodate variations in the outer dimension such that the first and the second flanges can be attached to each other.

In another embodiment according to the previous embodiment, the outer dimension is an outer diameter of the outermost surface of the component housing relative to a central axis, and wherein at least one substrate wrapped with at least one mat is held within the component housing.

In another embodiment according to any of the previous embodiments, the at least one exhaust component comprises a secondary housing that completely surrounds the component housing such that there is a gap between an inner surface of the secondary housing and an outer surface of the component housing.

In another embodiment according to any of the previous embodiments, the second flange is integrally formed with the secondary housing about the opening and is fixed to the first flange to provide a sealed attachment.

In another embodiment according to any of the previous embodiments, the first flange comprises a pipe with a base end portion fixed to the component housing and a wall portion surrounding the sensor boss and extending from the base end portion to a distal end to form the first flange, and wherein an outer peripheral surface of the wall portion is attached to the second flange.

In another embodiment according to any of the previous embodiments, the first flange comprises a sensor flange surrounding the sensor boss and extending from the component housing to a distal end to form the first flange, and wherein an outer peripheral surface of the sensor flange is attached to the second flange.

In another embodiment according to any of the previous embodiments, the second flange comprises a patch having a base fixed to the secondary housing and a patch wall portion surrounding the opening and extending from the base to a patch distal end to form the second flange, and wherein the second flange is fixed to the first flange to provide a sealed attachment.

In another embodiment according to any of the previous embodiments, the first flange comprises a pipe with a base end portion fixed to the component housing and a pipe wall portion surrounding the sensor boss and extending from the base end portion to a pipe distal end to form the first flange, and wherein the an outer peripheral surface of the pipe wall portion is attached to the second flange.

In another embodiment according to any of the previous embodiments, a sensor flange surrounds the sensor boss and extends from the component housing to a sensor flange distal end to form the first flange, and wherein an outer peripheral surface of the sensor flange is attached to the second flange.

In another embodiment according to any of the previous embodiments, the secondary housing comprises an acoustic housing providing an acoustic volume within the gap, and including at least one acoustic connection between the acoustic volume and an exhaust gas flow path within the component housing.

In another embodiment according to any of the previous embodiments, the component housing provides an internal cavity having an exhaust gas flow path that flows from an exhaust gas inlet to an exhaust gas outlet, and including at least one aftertreatment element positioned within the internal cavity, and wherein the at least one acoustic connection comprises a neck that connects the acoustic volume to the exhaust gas flow path in the component housing.

In another embodiment according to any of the previous embodiments, the component housing comprises an inner central housing, an inner inlet cone attached to an upstream end of the inner central housing to define the exhaust gas inlet, and an inner outlet cone attached to a downstream end of the inner central housing to define the exhaust gas inlet, and wherein the acoustic housing comprises an outer central housing, an outer inlet cone attached to an upstream end of the outer central housing, and an outer outlet cone attached to a downstream end of the outer central housing such that the acoustic volume does not provide any portion of the exhaust gas flow path.

In another embodiment according to any of the previous embodiments, the first flange is fixed to the component housing such that as the outer dimension varies, the relative position between the first and second flanges varies in a radial direction.

In another exemplary embodiment, a method includes providing a component housing defined by an outer dimension and having at least one sensor opening with a sensor boss surrounding the at least one sensor opening, positioning at least one exhaust component radially outward of the component housing, the at least one exhaust component including an opening that surrounds the at least one sensor opening, providing a first flange to extend about an outer periphery of the sensor boss, and associating a second flange with the opening of the at least one exhaust component to accommodate variations in the outer dimension such that the first and second flanges can be still be attached to each other as the outer dimension increases and decreases within a predetermined dimensional range.

In another embodiment according to any of the previous embodiments, the at least one exhaust component comprises a secondary housing, and including completely surrounding the component housing such that there is a gap between an inner surface of the secondary housing and an outer surface of the component housing.

In another embodiment according to any of the previous embodiments, the method includes integrally forming the second flange with the secondary housing about the opening and fixing the second flange to the first flange to provide a sealed attachment.

In another embodiment according to any of the previous embodiments, the first flange comprises a pipe with a base end portion fixed to the component housing and a wall portion surrounding the sensor boss and extending from the base end portion to a distal end to form the first flange, and including attaching an outer peripheral surface of the wall portion to the second flange, or the first flange comprises a sensor flange surrounding the sensor boss and extending from the component housing to a distal end to form the first flange, and including attaching an outer peripheral surface of the sensor flange to the second flange.

In another embodiment according to any of the previous embodiments, the method includes forming the second flange as a patch having a base fixed to the secondary housing and a patch wall portion surrounding the opening and extending from the base to a patch distal end to form the second flange, and including fixing the second flange to the first flange to provide a sealed attachment.

In another embodiment according to any of the previous embodiments, the first flange comprises a pipe with a base end portion fixed to the component housing and a pipe wall portion surrounding the sensor boss and extending from the base end portion to a pipe distal end to form the first flange, and including attaching an outer peripheral surface of the pipe wall portion to the second flange, or a sensor flange surrounds the sensor boss and extends from the component housing to a sensor flange distal end to form the first flange, and including attaching an outer peripheral surface of the sensor flange to the second flange.

In another embodiment according to any of the previous embodiments, the secondary housing comprises an acoustic housing, and the method includes providing an acoustic volume within the gap and at least one acoustic connection between the acoustic volume and an exhaust gas flow path within the component housing.

These and other features of this application will be best understood from the following specification and drawings, the following of which is a brief description.

DETAILED DESCRIPTION

Figure 1:
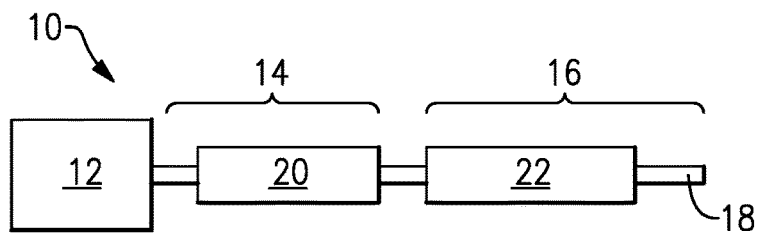
FIG. 1 is a schematic view of a vehicle exhaust system.

FIG. 1 shows a schematic representation of a vehicle exhaust system 10 that conducts hot exhaust gases generated by an engine 12 through various exhaust components to reduce emission and control noise. The exhaust system 10 includes a hot end section 14 that is located immediately downstream of the engine 12 and a cold end section 16, which is downstream of the hot end section 14 and exits to atmosphere via a tailpipe 18. Exhaust components 20 at the hot end 14 section can include, for example, exhaust gas aftertreatment elements such as a diesel oxidation catalyst (DOC), a diesel particulate filter (DPF), a gasoline particulate filter (GPF), a selective catalytic reduction (SCR) catalyst, etc., which are used to remove contaminants from the exhaust gas as known. Exhaust components 22 at the cold end section 16 can include, for example, pipes with acoustic valves, resonators, mufflers, etc., which are used to control acoustics and noise. The described exhaust components can be mounted in various different configurations and combinations dependent upon vehicle application and available packaging space.

Figure 2A:
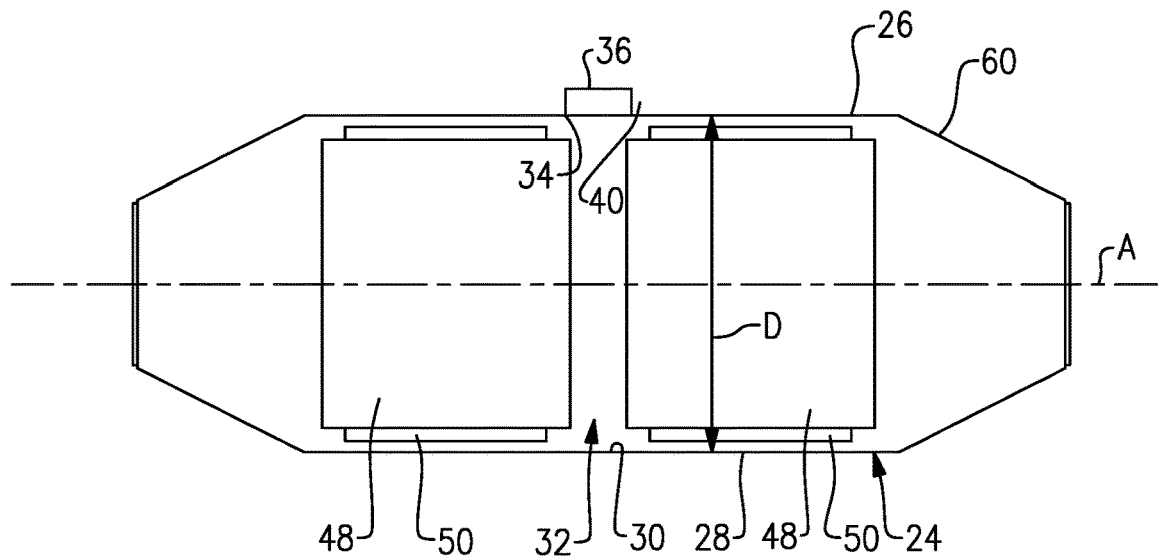
FIG. 2A shows a schematic side view of one example embodiment of an aftertreatment component with a sensor boss.

FIG. 2A shows one example of an aftertreatment component 24 from the hot end section 14. In this example configuration, the aftertreatment component 24 includes an aftertreatment component housing 26 defining a central axis A and having an outer peripheral surface 28 and an inner peripheral surface 30 that defines an internal cavity 32. The component housing 26 includes one or more sensor openings 34 that extend through a thickness of the housing 26 from the inner 30 to the outer 28 peripheral surface. A sensor boss 36 surrounds the sensor opening 34. A sensor (not shown) is attached to the sensor boss 36 to measure and/or monitor one or more exhaust gas component characteristics, and such sensors can include pressure sensors, temperature sensors, flow rate sensors, heated exhaust gas oxygen (HEGO) sensors, etc.

Figure 2B:
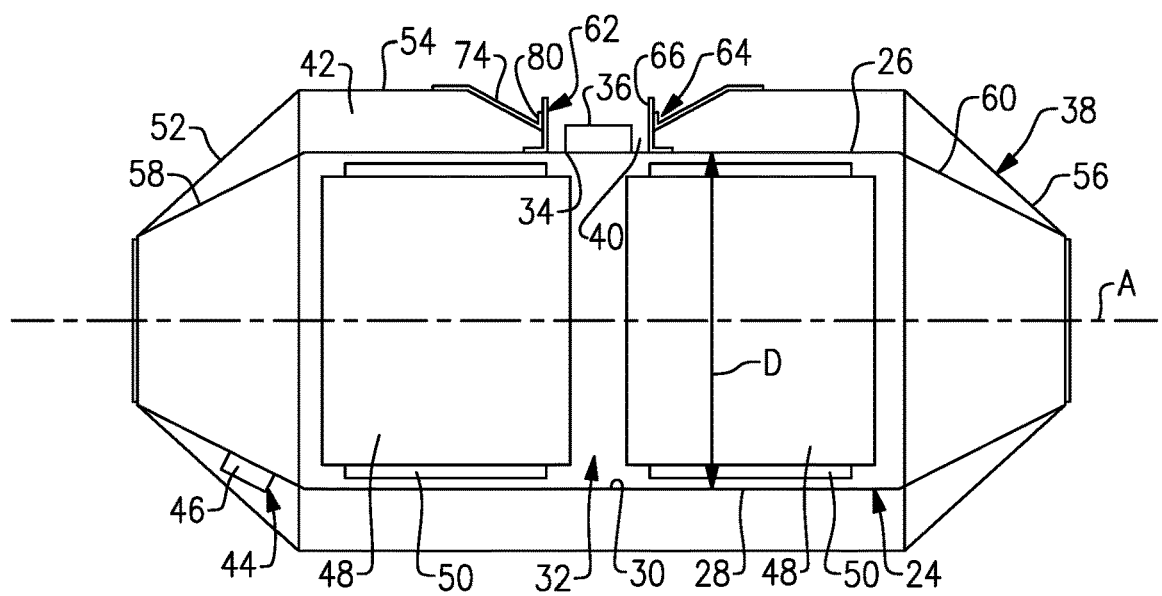
FIG. 2B shows a schematic side view of one example embodiment of a connection interface between an aftertreatment component with a sensor boss as shown in FIG. 2A and a secondary housing surrounding the aftertreatment component.

In one example shown in FIG. 2B, a secondary exhaust component is positioned radially outwardly of the component housing 26 and can comprise a heat shield, insulating housing, acoustic housing, etc. In the example shown, the exhaust component comprises an acoustic housing 38 and includes an opening 40 that surrounds the sensor opening 34. The acoustic housing 38 completely surrounds the component housing 26 to provide a completely sealed acoustic volume 42 between the acoustic housing 38 and the component housing 26.

To address package space limitations in the cold end section 16, acoustic solutions are being considered in the hot end section 14. This unique area of application utilizes sealed acoustic volumes 42 connected to the exhaust flow via one or more acoustic connections 44 such as an opening, perforations, Helmholtz necks, etc. In the example shown in FIG. 2B, the acoustic volume 42 surrounds a pipe or an aftertreatment component 24 that passes through the volume 42.

In the example shown in FIG. 2B, a Helmholtz neck 46 is utilized as the acoustic connection 44 between the sealed acoustic volume 42 and the aftertreatment component 24. Other examples of such acoustic connections and associated acoustic volumes are found in PCT/US17/53186, which is assigned to the same assignee and is herein incorporated by reference. In this type of configuration, where the acoustic volume 42 surrounds an aftertreatment component 24, issues can arise with regard to associated sensor bosses 36 and manufacturing tolerance variations.

Most aftertreatment components 24, e.g., three-way convertors (TWC), diesel particulate filters (DPF), gas particulate filters (GPF), selective catalytic reduction catalysts (SCR), diesel oxidation catalysts (DOC), etc., have a sheet metal component housing 26 that houses a ceramic brick or substrate 48, e.g., an after-treatment element, which is securely held in place via a fibrous, compliant, heat-resistant material that is typically referred to as a mat 50. The mat 50 applies a pressure to the substrate 48, which is important to ensure that that mat 50 or substrate 48 does not slip (too little pressure) or damage the substrate 48 (too much pressure). This force or pressure is controlled by controlling the GBD (Gap Bulk Density). The GBD is determined by a density of the mat material, a thickness of the mat 50, a diameter of the substrate 48, and a surrounding diameter of the component housing 26. In one example, the mat density, the mat thickness, and the brick diameter are known and/or measured quantities, and the resulting necessary diameter of the housing 26 is calculated. The diameter of the housing 26 is then adjusted to reach the desired GBD.

As such, the diameter of the housing 26 is variable in order to maintain the GBD in the desired range. In one example, the variation in the diameter of the component housing 26 is of the order of nominal+/−2 mm range. This range can vary as needed depending upon component configuration and application.

As discussed above, these aftertreatment components 24 often include at least one sensor boss 36 that is attached to the component housing 26 for installation of a sensor. Access to this sensor must be maintained when an acoustic volume from a secondary exhaust component, e.g. an acoustic housing 38, is surrounding the aftertreatment component 24. Further, it is essential that this surrounding acoustic volume 42 be as leak proof as would be required for the aftertreatment component 24 alone such that the component will pass emissions regulations. To achieve such a sealed connection, any gaps between the acoustic housing 38, component housing 26, and/or sensor boss 36 need to be minimized to ensure good weld connections. The variation in the diameter of the housing 26 of +/−2 mm makes this difficult to achieve.

The subject disclosure provides a connection interface between the components to accommodate for this diameter variance. As discussed above, FIG. 2B shows a configuration with a sealed acoustic volume 42 enclosing an exhaust aftertreatment component 24 such as a TWC, for example. In this example, the acoustic volume 42 is formed by the acoustic housing 38 which comprises an outer inlet cone 52, a central housing portion 54, and outer outlet cone 56. Optionally, the acoustic housing 38 could be formed by two stamped half-shells forming the same basic shape.

The aftertreatment component 24 comprises an inner inlet cone 58, the component housing 26, e.g. a center housing portion, and an inner outlet cone 60. The component housing 26 defines the internal cavity 32 that houses one or more aftertreatment substrates 48 (two substrates 48 are shown as an example). The substrates 48 are held in place by at least one mat 50, or each substrate 48 has its own mat 50 as shown. The inner inlet cone 58 provides an exhaust gas inlet to the internal cavity 32 and the inner outlet cone 60 provides an exhaust gas outlet from the internal cavity 32. The outer inlet cone 52 and the outer outlet cone 56 are respectively welded or otherwise fixed to the inner inlet cone 58 and the outer outlet cone 60 in a sealed manner.

The open space between an inner surface of the acoustic housing 38 and an outer surface of the component 24 provides the acoustic volume 42. The acoustic volume 42 is connected to the gas flow path in the internal cavity 32 via the acoustic connection 44. In this example, the acoustic connection 44 comprises a short neck pipe or Helmholtz neck 46 that is located in the inner inlet cone 58 of the component 24. Optionally, instead of a pipe or neck, this could be a section of perforations or simply a hole. Additionally, there are alternative possible locations of the acoustic connection 44 such as the component center housing 26 or inner outlet cone 60, for example. Also, there may be other configurations where it is desirable to surround the component 24 with a sealed volume 42 having no connection to the exhaust gas flow path. For example, the sealed volume 42 could be filled with insulating material to ensure the substrates 48 become hot quickly and maintain their heat longer while simultaneously preventing the acoustic housing 38 from getting too hot and potentially reducing the need for additional heatshields.

As discussed above, an outer dimension D of the aftertreatment component 24 can vary, which makes it difficult to provide for a sealed volume 42 within the acoustic housing 38. The subject disclosure provides an attachment interface that connects the component housing 26 to the acoustic housing 38 to provide the sealed volume 42. The attachment interface includes a first flange 62 that extends about an outer periphery of the sensor boss 36 and a second flange 64 that is associated with the opening 40 of the acoustic housing 38 to accommodate variations in the outer dimension D such that the first 62 and second 64 flanges can be attached to each other to provide the sealed volume 42.

FIG. 2B shows a configuration that can accommodate this variation. In one example, the outer dimension D comprises an outer diameter of the component housing 26. In this example, the outer diameter is an outermost diameter of the component housing 26 that varies to provide the desired GBD. The component housing 26 may have any of various shapes and cross-sections that can be curved (circular, oval, etc.) or polygonal (square, rectangular, etc.), or can be a combination of curved and polygonal shapes. The outer dimension D is defined in relation to the shape of the component housing to provide the desired GBD.

Figure 3:
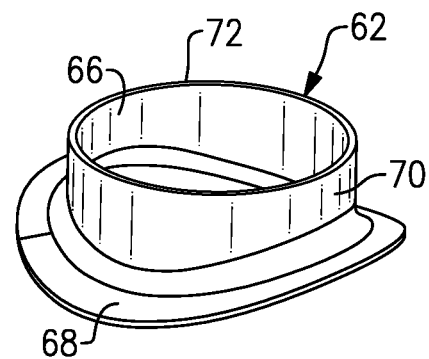
FIG. 3 is a perspective view of a pipe as used in the embodiment of FIG. 2B.
Figure 4:
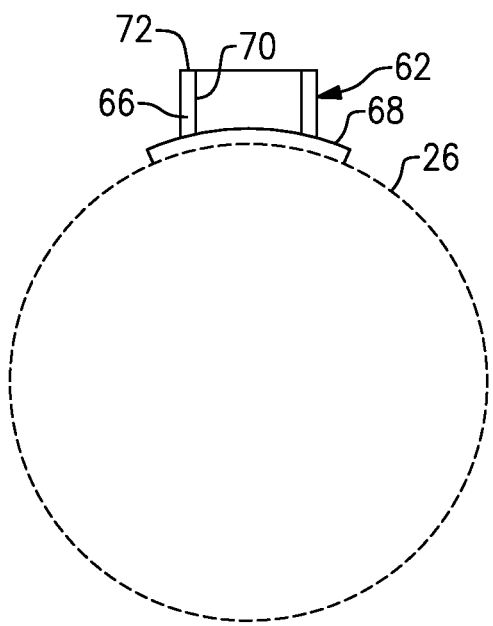
FIG. 4 is an end view of the pipe of FIG. 3 installed on a housing of the embodiment of FIG. 2B.

In the example of FIG. 2B, the first flange 62 comprises a pipe 66 having a base end portion 68 (FIGS. 3-4) fixed to the outer housing 26 and a wall portion 70 (FIGS. 3-4) surrounding the sensor boss 36 (FIG. 2B) and extending from the base end portion 68 to a distal end 72 to form the first flange 62 as best shown in FIGS. 3 and 4. An outer peripheral surface of the wall portion 70 is attached to the second flange 64 with a weld to provide a sealed connection.

Figure 5:
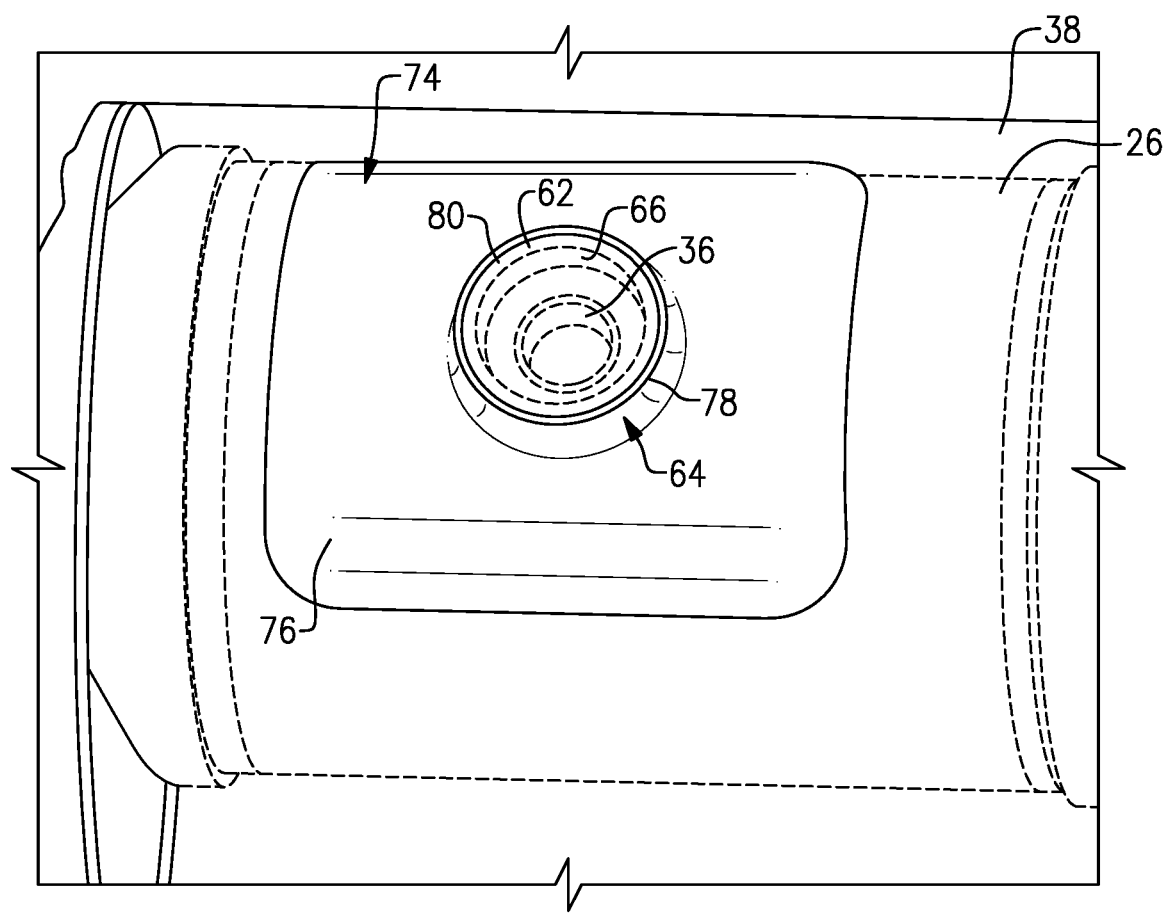
FIG. 5 is a top perspective view of the embodiment shown in FIG. 2B.
Figure 6:
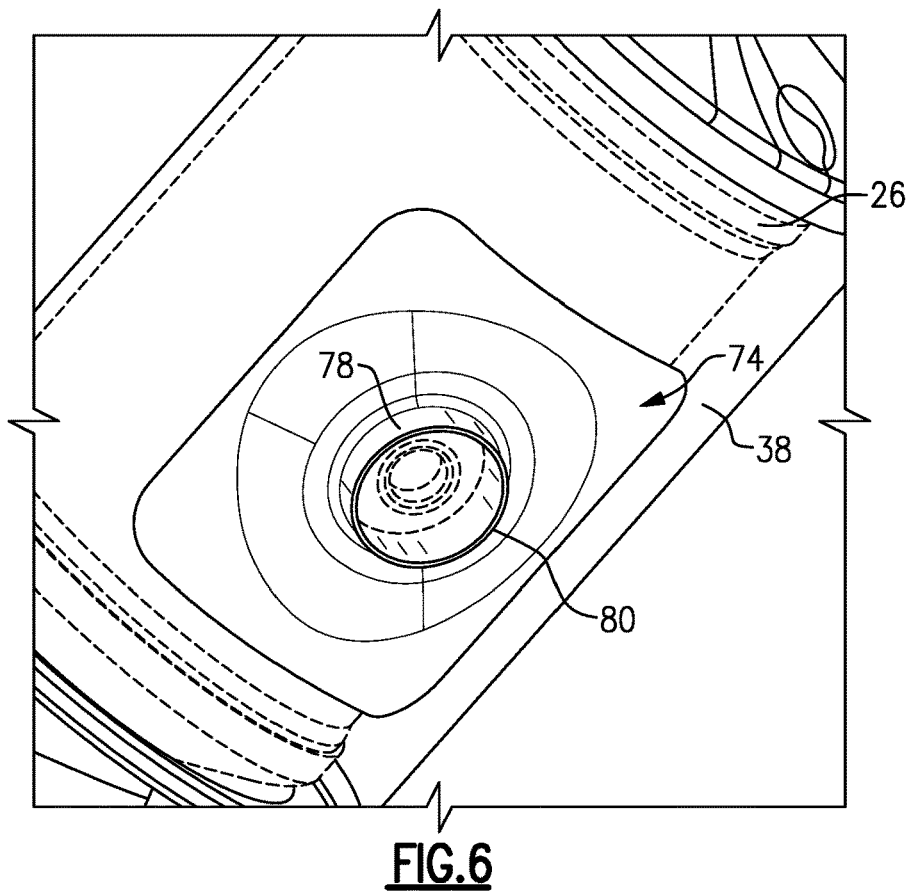
FIG. 6 is another top perspective view of the embodiment shown in FIG. 2B.

In this example, the second flange 64 comprises a wrapper patch 74 that has a base 76 fixed to the acoustic housing 38 and a patch wall 78 that surrounds the opening 40 (FIG. 2B) in the acoustic housing 38. The patch wall 78 extends from the base 76 to a patch distal end 80 to form the second flange 64 as best shown in FIGS. 5 and 6. The second flange 64 is fixed to the first flange 62 to provide the sealed attachment interface.

In this configuration, the pipe 66 provides straight vertical surfaces, e.g. the first flange 62, around the sensor boss 36, and the wrapper patch 74 provides straight vertical surfaces, e.g. the second flange 64, that mate with the pipe 66. As the outer diameter of the component housing 26 varies, the pipe 66 will move radially inward and outward with the housing 26 as a result of the variation. The wrapper patch 74 can slide up and down the first flange 62 without losing contact with the pipe 66 such that the flanges 62, 64 can still be attached to each other as the outer dimension D increases and decreases within a predetermined dimensional range.

In one example, the pipe 66 has a fishmouth design (see FIG. 3) to allow the pipe 66 to fit closely to the curved outer surface of the component housing 26. Optionally, the wall 70 of the pipe 66 could abut directly against the housing 26 rather than having the base portion 68; however, the base portion 68 provides for a better weld interface. The wrapper patch 74 uses the vertical second flange 64 to fit smoothly over the fishmouth pipe 66 and can be easily welded. Optionally, the wrapper patch 74 itself could comprise the second flange and be directly abutted against the fishmouth pipe 66; however, this configuration would be more difficult to weld.

Figure 7:
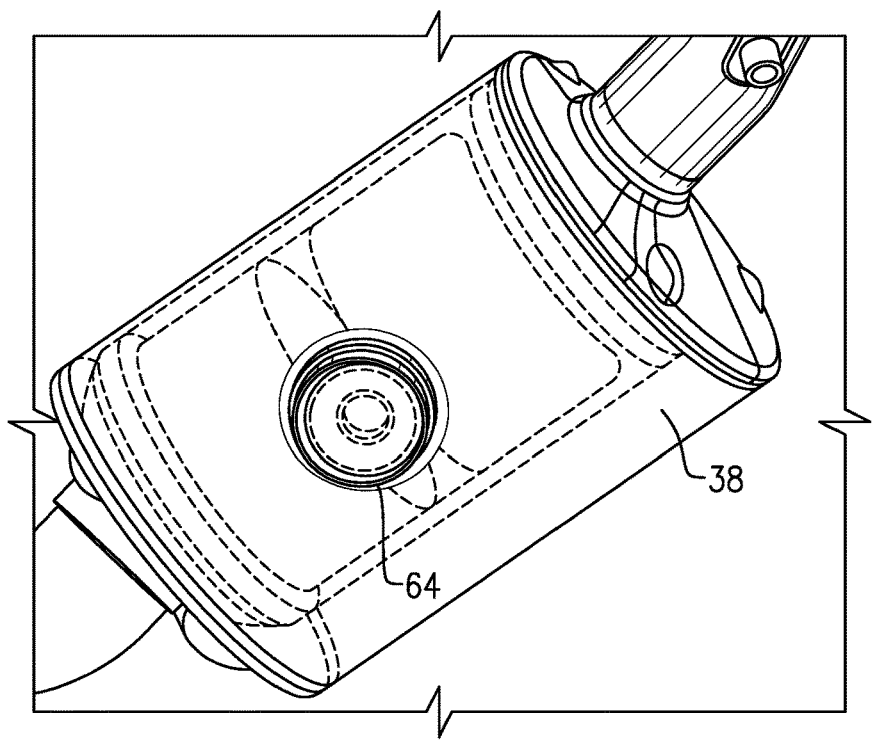
FIG. 7 is a top perspective view of another embodiment of a connection interface between an aftertreatment component with a sensor boss and a secondary housing surrounding the aftertreatment component.
Figure 8:
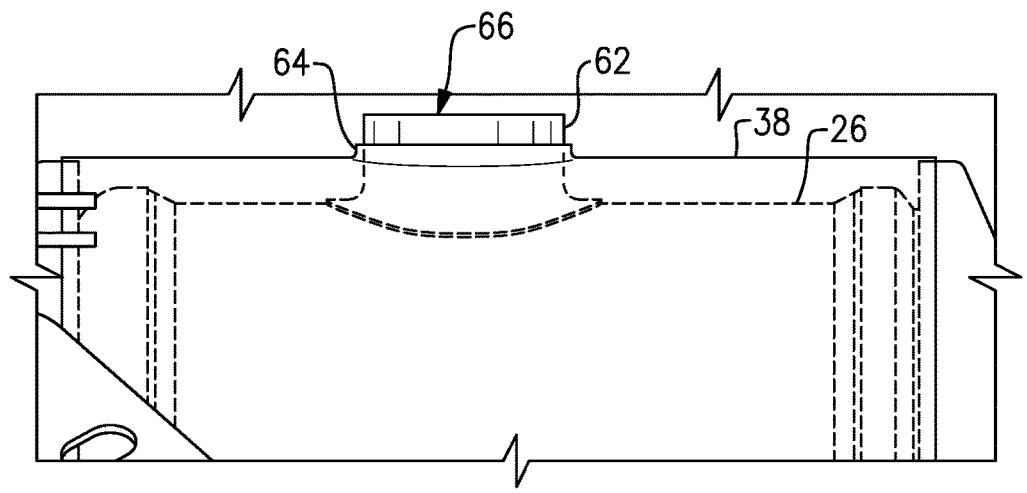
FIG. 8 is a side view of the embodiment shown in FIG. 7.

FIGS. 7 and 8 show another example embodiment that is similar to that shown in FIGS. 2-6 but in this configuration the second flange 64 is integrally formed with the acoustic housing 38. The second flange 64 is integrally formed with the housing 38 about the opening 40 and is fixed to the first flange 62 to provide the sealed attachment.

Figure 9:
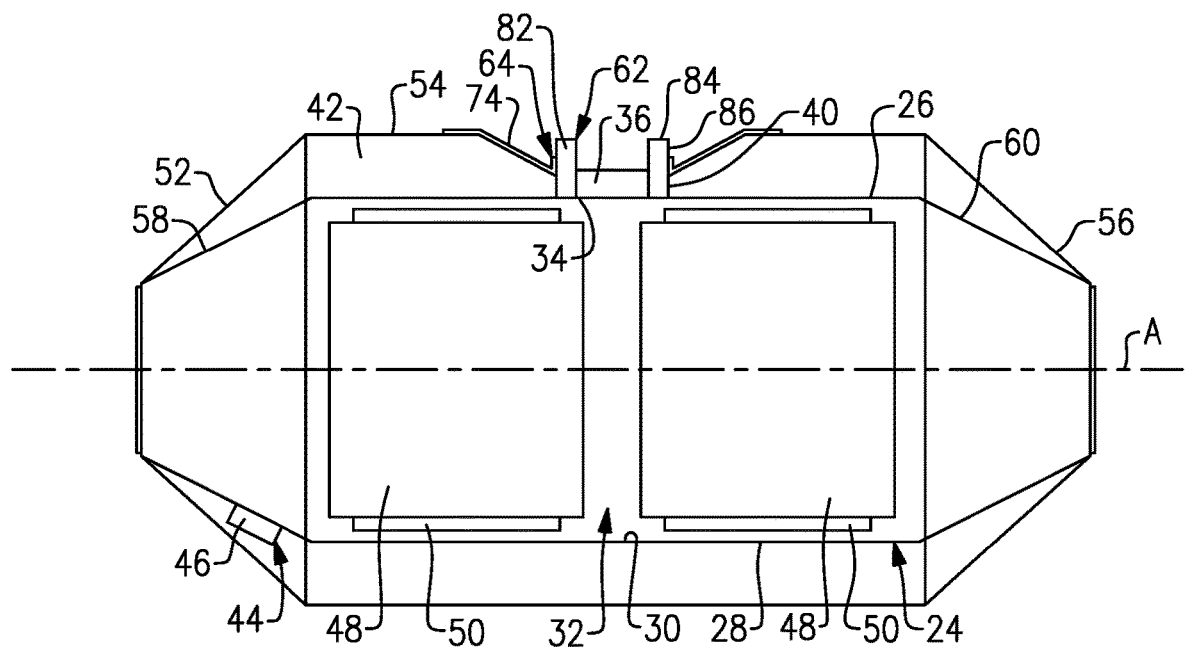
FIG. 9 is a schematic side view of another example embodiment of a connection interface between an aftertreatment component with a sensor boss and a secondary housing surrounding the aftertreatment component.

FIG. 9 shows another example embodiment. In this example, the first flange 62 comprises a sensor flange 82 that is formed with and surrounds the sensor boss 36. The sensor flange 82 extends from the sensor boss 36 to a distal end 84 to form the first flange 62. An outer peripheral surface 86 of the sensor flange 82 is attached to the second flange 64. The second flange 64 can be in the form of the wrapper patch 74 as shown in FIG. 9 or the second flange 64 can be integrally formed with the acoustic housing 38 as shown in FIG. 8. The second flange 64 slides up and down the sensor flange 82 without losing contact with the sensor flange 82 such that the first and second flanges 62, 64 can still be attached to each other as the outer dimension D increases and decreases within a predetermined dimensional range.

The height of the first flange 62 of the fishmouth pipe 66 or the sensor flange 82 may determine how the pieces of the acoustic housing 38 (52, 54, 56, 74) are assembled. If a short enough height is allowable then the central housing portion 54 may be pushed over the outer inlet and outlet cones 52, 56. If the height is taller, then it may be necessary to wrap a blank around a sub-assembly of the central housing portion 54 with the outer inlet and outlet cones 52, 56 already in place.

The subject disclosure addresses sensor boss issues that are raised as a result of a sealed acoustic volume 42 surrounding an aftertreatment component 24 in combination with the diameter of the component housing 26 of the aftertreatment component 24 being variable in order to maintain the GBD in the desired range. The subject disclosure provides a connection interface between the components to accommodate for this diameter variance where the acoustic housing includes a flange that can slide radially inwardly and outwardly relative to a mating flange that moves with the component housing 26 as the diameter varies due to GBD.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An exhaust component assembly comprising:
   a component housing defined by an outer dimension and having at least one sensor opening, wherein the component housing provides an internal cavity having an exhaust gas flow path that flows from an exhaust gas inlet to an exhaust gas outlet;
   a sensor boss surrounding the at least one sensor opening;
   at least one exhaust component positioned radially outwardly of the component housing and including an opening that surrounds the at least one sensor opening, and wherein the at least one exhaust component comprises an acoustic housing that completely surrounds the component housing such that there is an open gap between an inner surface of the acoustic housing and an outer surface of the component housing that extends from the exhaust gas inlet to the exhaust gas outlet, and wherein the acoustic housing provides an acoustic volume that extends from the exhaust gas inlet to the exhaust gas outlet within the open gap, and including at least one acoustic connection between the acoustic volume and an exhaust gas flow path within the component housing;
   a first flange extending about an outer periphery of the sensor boss; and
   a second flange associated with the opening of the at least one exhaust component to accommodate variations in the outer dimension such that the first and the second flanges can be attached to each other.

2. The exhaust component assembly according claim 1 wherein the outer dimension is an outer diameter of the outermost surface of the component housing relative to a central axis, and wherein at least one substrate wrapped with at least one mat is held within the component housing.

3. The exhaust component assembly according claim 1 wherein the second flange is integrally formed with the acoustic housing about the opening and is fixed to the first flange to provide a sealed attachment.

4. The exhaust component assembly according claim 3 wherein the first flange comprises a pipe with a base end portion fixed to the component housing and a wall portion surrounding the sensor boss and extending from the base end portion to a distal end to form the first flange, and wherein an outer peripheral surface of the wall portion is attached to the second flange.

5. The exhaust component assembly according claim 3 wherein the first flange comprises a sensor flange surrounding the sensor boss and extending from the component housing to a distal end to form the first flange, and wherein an outer peripheral surface of the sensor flange is attached to the second flange.

6. The exhaust component assembly according claim 1 wherein the second flange comprises a patch having a base fixed to the acoustic housing and a patch wall portion surrounding the opening and extending from the base to a patch distal end to form the second flange, and wherein the second flange is fixed to the first flange to provide a sealed attachment.

7. The exhaust component assembly according claim 6 wherein the first flange comprises a pipe with a base end portion fixed to the component housing and a pipe wall portion surrounding the sensor boss and extending from the base end portion to a pipe distal end to form the first flange, and wherein an outer peripheral surface of the pipe wall portion is attached to the second flange.

8. The exhaust component assembly according claim 6 including a sensor flange surrounding the sensor boss and extending from the component housing to a sensor flange distal end to form the first flange, and wherein an outer peripheral surface of the sensor flange is attached to the second flange.

9. The exhaust component assembly according claim 1 including at least one aftertreatment element positioned within the internal cavity, and wherein the at least one acoustic connection comprises a neck that connects an entirety of the acoustic volume, which extends from the exhaust gas inlet to the exhaust gas outlet, to the exhaust gas flow path in the component housing.

10. The exhaust component assembly according claim 1 wherein the first flange is fixed to the component housing such that as the outer dimension varies, the relative position between the first and second flanges varies in a radial direction.

11. The exhaust component assembly according claim 1 wherein the at least one sensor opening defines a center axis and wherein the first flange comprises a pipe with a base portion fixed to an outer surface of the component housing and a wall portion having an outer wall surface spaced radially inward of an outer peripheral edge of the base portion toward the center axis and surrounding the sensor boss, and wherein the wall portion extends from the base portion to a distal end.

12. The exhaust component assembly according claim 11 wherein the base portion is curved to fit closely to the outer surface of the component housing which comprises a curved surface.

13. An exhaust component assembly comprising:
a component housing defined by an outer dimension and having at least one sensor opening, wherein the component housing provides an internal cavity having an exhaust gas flow path that flows from an exhaust gas inlet to an exhaust gas outlet;
at least one aftertreatment element positioned within the internal cavity;
a sensor boss surrounding the at least one sensor opening;
at least one exhaust component positioned radially outwardly of the component housing and including an opening that surrounds the at least one sensor opening, wherein the at least one exhaust component comprises a secondary housing that completely surrounds the component housing such that there is a gap between an inner surface of the secondary housing and an outer surface of the component housing;
the secondary housing comprises an acoustic housing providing an acoustic volume within the gap;
at least one acoustic connection between the acoustic volume and the exhaust gas flow path within the component housing, wherein the at least one acoustic connection comprises a neck that connects the acoustic volume to the exhaust gas flow path in the component housing;
a first flange extending about an outer periphery of the sensor boss; and
a second flange associated with the opening of the at least one exhaust component to accommodate variations in the outer dimension such that the first and the second flanges can be attached to each other; and wherein the component housing comprises an inner central housing, an inner inlet cone attached to an upstream end of the inner central housing to define the exhaust gas inlet, and an inner outlet cone attached to a downstream end of the inner central housing to define the exhaust gas outlet, and wherein the acoustic housing comprises an outer central housing, an outer inlet cone attached to an upstream end of the outer central housing, and an outer outlet cone attached to a downstream end of the outer central housing such that the acoustic volume does not provide any portion of the exhaust gas flow path.

14. A method comprising:
providing a component housing defined by an outer dimension and having at least one sensor opening with a sensor boss surrounding the at least one sensor opening, and wherein the component housing provides an internal cavity having an exhaust gas flow path that flows from an exhaust gas inlet to an exhaust gas outlet;
positioning at least one exhaust component radially outward of the component housing, the at least one exhaust component including an opening that surrounds the at least one sensor opening, and wherein the at least one exhaust component comprises an acoustic housing that completely surrounds the component housing such that there is an open gap between an inner surface of the acoustic housing and an outer surface of the component housing that extends from the exhaust gas inlet to the exhaust gas outlet, and wherein the acoustic housing provides an acoustic volume that extends from the exhaust gas inlet to the exhaust gas outlet within the open gap, and including at least one acoustic connection between the acoustic volume and an exhaust gas flow path within the component housing;
providing a first flange to extend about an outer periphery of the sensor boss; and
associating a second flange with the opening of the at least one exhaust component to accommodate variations in the outer dimension such that the first and second flanges can be still be attached to each other as the outer dimension increases and decreases within a predetermined dimensional range.

15. The method according claim 14 including integrally forming the second flange with the acoustic housing about the opening and fixing the second flange to the first flange to provide a sealed attachment.

16. The method according claim 15 wherein:
the first flange comprises a pipe with a base end portion fixed to the component housing and a wall portion surrounding the sensor boss and extending from the base end portion to a distal end to form the first flange, and including attaching an outer peripheral surface of the wall portion to the second flange, or
the first flange comprises a sensor flange surrounding the sensor boss and extending from the component housing to a distal end to form the first flange, and including attaching an outer peripheral surface of the sensor flange to the second flange.

17. The method according claim 14 including forming the second flange as a patch having a base fixed to the acoustic housing and a patch wall portion surrounding the opening and extending from the base to a patch distal end to form the second flange, and including fixing the second flange to the first flange to provide a sealed attachment.

18. The method according claim 17 wherein:
the first flange comprises a pipe with a base end portion fixed to the component housing and a pipe wall portion surrounding the sensor boss and extending from the base end portion to a pipe distal end to form the first flange, and including attaching an outer peripheral surface of the pipe wall portion to the second flange, or a sensor flange surrounds the sensor boss and extends from the component housing to a sensor flange distal end to form the first flange, and including attaching an outer peripheral surface of the sensor flange to the second flange.

19. The method according claim 14 wherein the component housing comprises an inner central housing, an inner inlet cone attached to an upstream end of the inner central housing to define the exhaust gas inlet, and an inner outlet cone attached to a downstream end of the inner central housing to define the exhaust gas outlet, and wherein the acoustic housing comprises an outer central housing, an outer inlet cone attached to an upstream end of the outer central housing, and an outer outlet cone attached to a downstream end of the outer central housing such that the acoustic volume does not provide any portion of the exhaust gas flow path.

20. The method according claim 14 wherein the at least one sensor opening defines a center axis and wherein the first flange comprises a pipe with a base portion fixed to an outer surface of the component housing and a wall portion having an outer wall surface spaced radially inward of an outer peripheral edge of the base portion toward the center axis and surrounding the sensor boss, and wherein the wall portion extends from the base portion to a distal end.

21. The method according claim 14 wherein the base portion is curved to fit closely to the outer surface of the component housing which comprises a curved surface.

* * * * *